Nov. 1, 1932.                    E. K. COLE                    1,886,247
                                CABLE SPLICE
                             Filed Dec. 15, 1930

Inventor
Elmer K. Cole
by Orwig & Hague Attys

Patented Nov. 1, 1932

1,886,247

UNITED STATES PATENT OFFICE

ELMER K. COLE, OF WINTERSET, IOWA

CABLE SPLICE

Application filed December 15, 1930. Serial No. 502,425.

The object of this invention is to provide improved means of simple, durable and inexpensive construction for connecting the end of a wire cable to a support.

This invention relates to that kind of wire cables in which there is a straight central strand composed of a number of wires wound about each other in helical form, and a series of outer strands each composed of a series of wires wound about each other in helical form, said outer strands being wound around the central strand in a helical manner.

Heretofore a patent was issued to me, dated December 11, 1928, Number 1,694,683, showing a form of cable clamp designed for use in connection with cables having no straight central strand, but having a series of strands wound about each other in helical form. The device issued in my said patent is not adapted for use in connection with the kind of cables before referred to having straight central strands.

More specifically it is my object to provide a cable splice especially adapted for the class of cables before described, and so constructed and arranged that as the tubular wedge is driven to clamping position, it will force the outer strands of the helical grooves within the body of splice device, and at the same time effect a clamping operation upon the central strand.

This invention consists in the construction, arrangement and combination of the various parts of the device, whereby the objects contemplated are attained, as hereinafter more fully set forth, pointed out in my claim, and illustrated in the accompanying drawing, in which:

Figure 1:
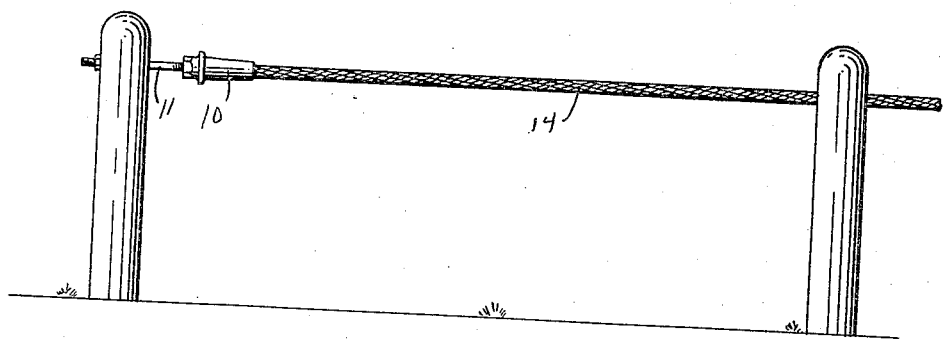
Figure 1 shows an elevation of a cable supported on posts and having one end thereof connected to a post by means of my improved splice device.
Figure 3:
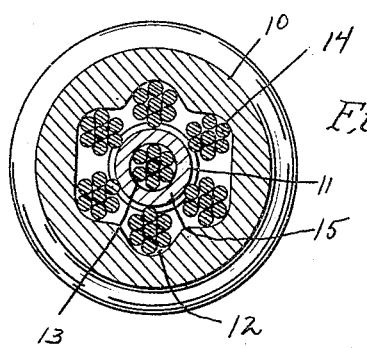
Figure 3 shows a transverse sectional view of the same on the line 3—3 of Figure 2.

Referring to the accompanying drawing, I have used the reference numeral 10 to indicate the body portion of my improved splice device. At one end it is provided with a screw threaded opening into which a screw threaded rod 11 is inserted. The interior of the body portion 10 is formed with an opening designed to receive a cable, and it is formed with a series of helically arranged grooves 12, tapering toward the end of the body 10 opposite from the rod 11. The cable proper belongs to that class of cables in which there is a straight central strand indicated by the numeral 13, and a series of helically arranged strands 14 surrounding it, each strand being composed of a number of wires helically wound around each other.

For the purpose of forcing the outer strands 14 into the helical grooves 12, and for producing a clamping effect upon the central strand 13, I have provided a wedge comprising a tubular body 15, having its interior hollow and of uniform diameter throughout, and having its outer surface tapered from a maximum thickness at 16 at the end adjacent to the rod 11, to a minimum thickness at 17. This tubular wedge is formed of malleable material.

Figure 2:
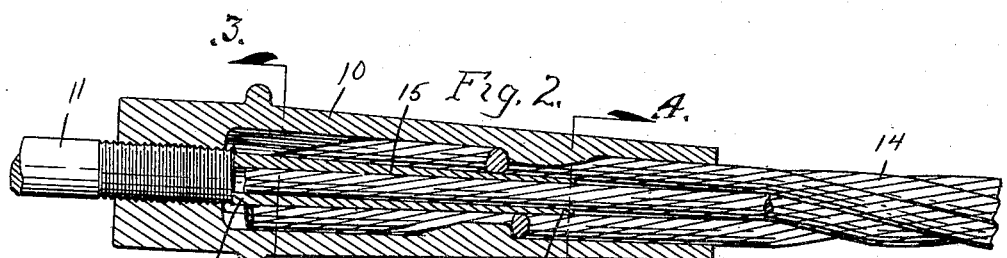
Figure 2 shows a central longitudinal sectional view through my improved splice device, a cable therein in clamped position.
Figures 5, 6:
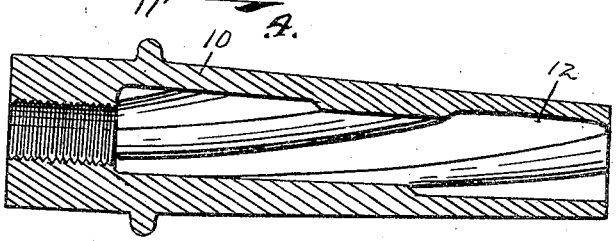
Figure 5 shows a longitudinal sectional view of the clamping wedge.
Figure 6 shows a longitudinal sectional view of the splice body showing the helical arrangement of the grooves therein.

In practical use, the end of the cable is first inserted in the body of the splice device, then the tubular wedge 15 is inserted through the screw threaded opening in the body 10 and between the central strand 13 and the outer strands 14 of the cable. It is then driven into the body 10 far enough to permit the insertion of the screw threaded rod 11. Then the screw threaded rod 11 is placed in position in the screw threaded opening and screwed into position, thus forcing the tapered wedge 15 into the position shown in Figure 2.

Figure 4:
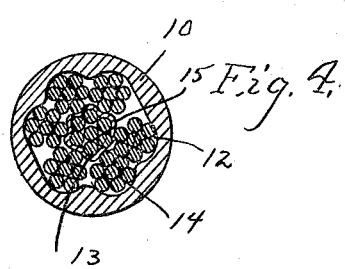
Figure 4 shows a similar view taken on the line 4—4 of Figure 2.

During this operation, the wedge does not rotate but moves straight forwardly into position. However, the outer strands are forced by the wedge into the helical grooves 12, and their outer surfaces engage the helical grooves throughout their length, while the inner surfaces engage the wedge throughout their length. When the wedge reaches the farthest position in which it may be forced by the screw threaded rod 11, then the pressure at the inner surfaces of the outer strands 14 of the cable compresses the malleable thin tapered edge 17 of the wedge 15 into position for clamping the wedge against the inner strand 13, as illustrated in Figure 4. Hence all of the strands are firmly clamped within the body 10.

As a result of repeated tests of this device in practical use I have demonstrated that with my improved splice device, stresses applied to the cable will cause the cable to break before it is withdrawn from the splice device.

I claim as my invention:

A cable splice especially designed for use in connection with a cable having a central strand composed of a number of wires twisted together and a series of outer strands each composed of a number of wires twisted together and comprising in combination a cable splice body portion formed with a tapered opening to receive the cable, the interior of the body portion being formed with longitudinally arranged grooves to receive the outer cable strands, and a tapered cylindrical wedge made of malleable metal and of such thickness at its small end that when it is forced into position surrounding a central cable strand and engaging the interior surfaces of the outer cable strands it will become formed with longitudinally arranged helical grooves fitting the adjacent contours of the wires composing the central cable strand and also the adjacent surfaces of the wires composing the outer cable strands to thereby uniformly distribute the clamping strains upon all of the adjacent surfaces of the inner and outer strands of the cable.

ELMER K. COLE.